May 17, 1966 R. W. DAVIDSON 3,251,489
CARGO HANDLING APPARATUS
Filed Feb. 11, 1963 8 Sheets-Sheet 1
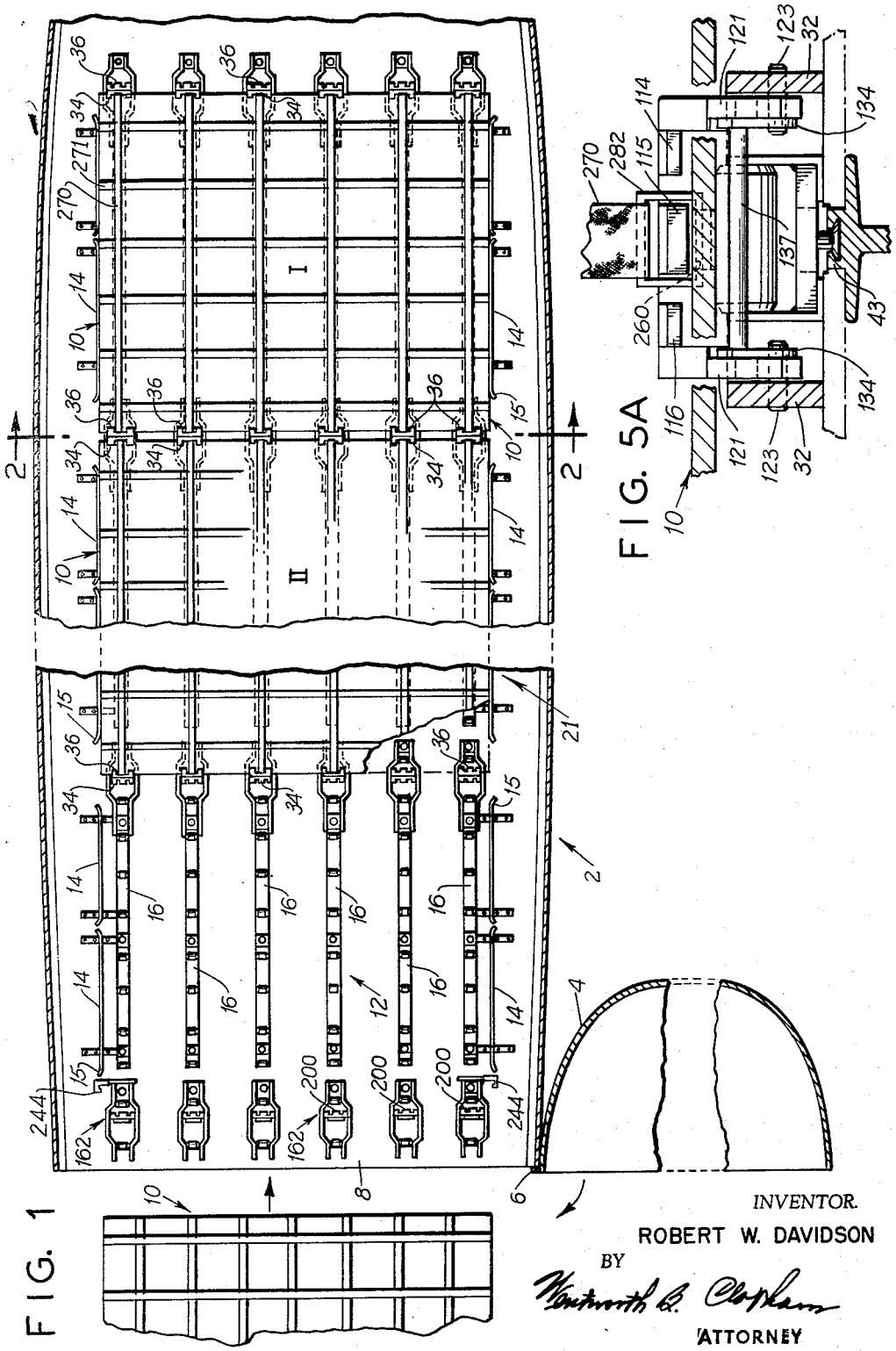
INVENTOR.
ROBERT W. DAVIDSON
BY
ATTORNEY

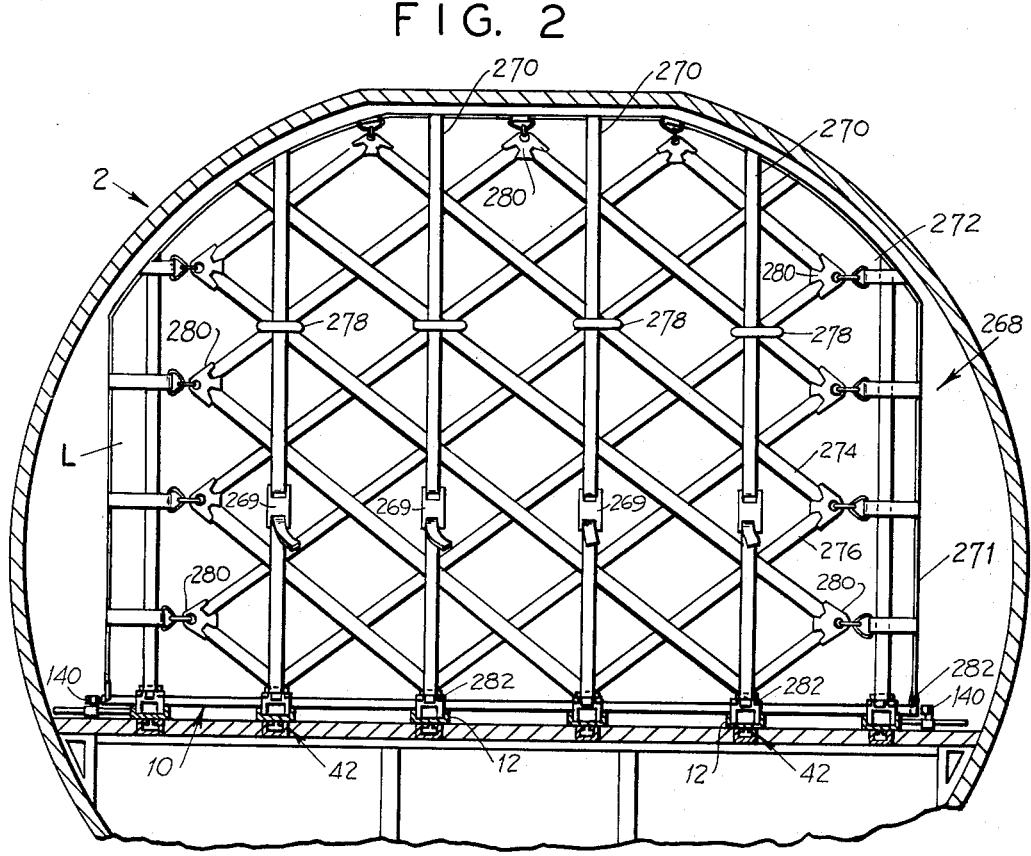
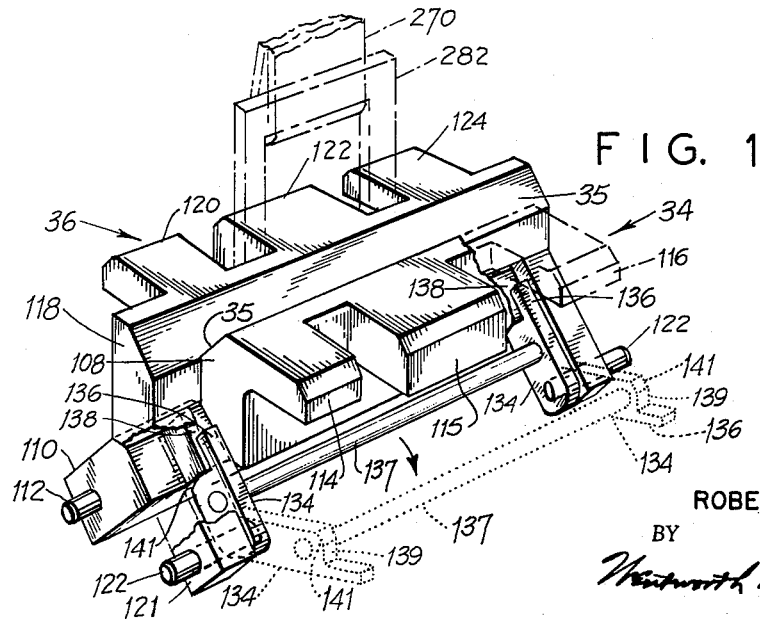

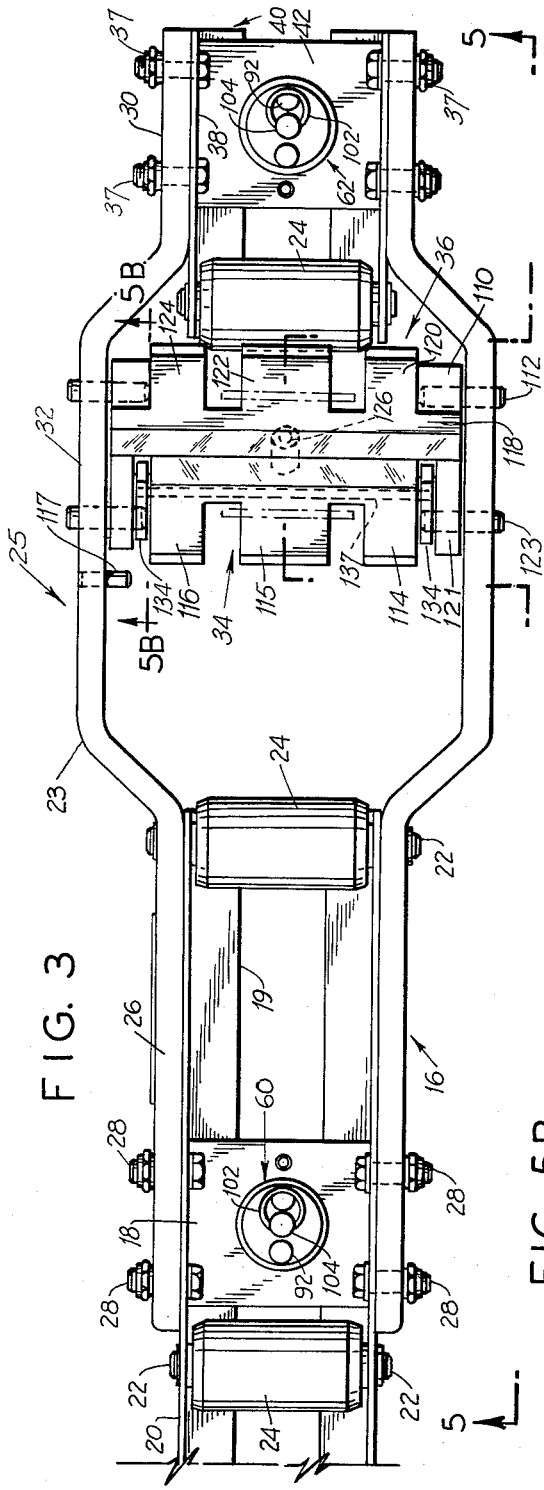

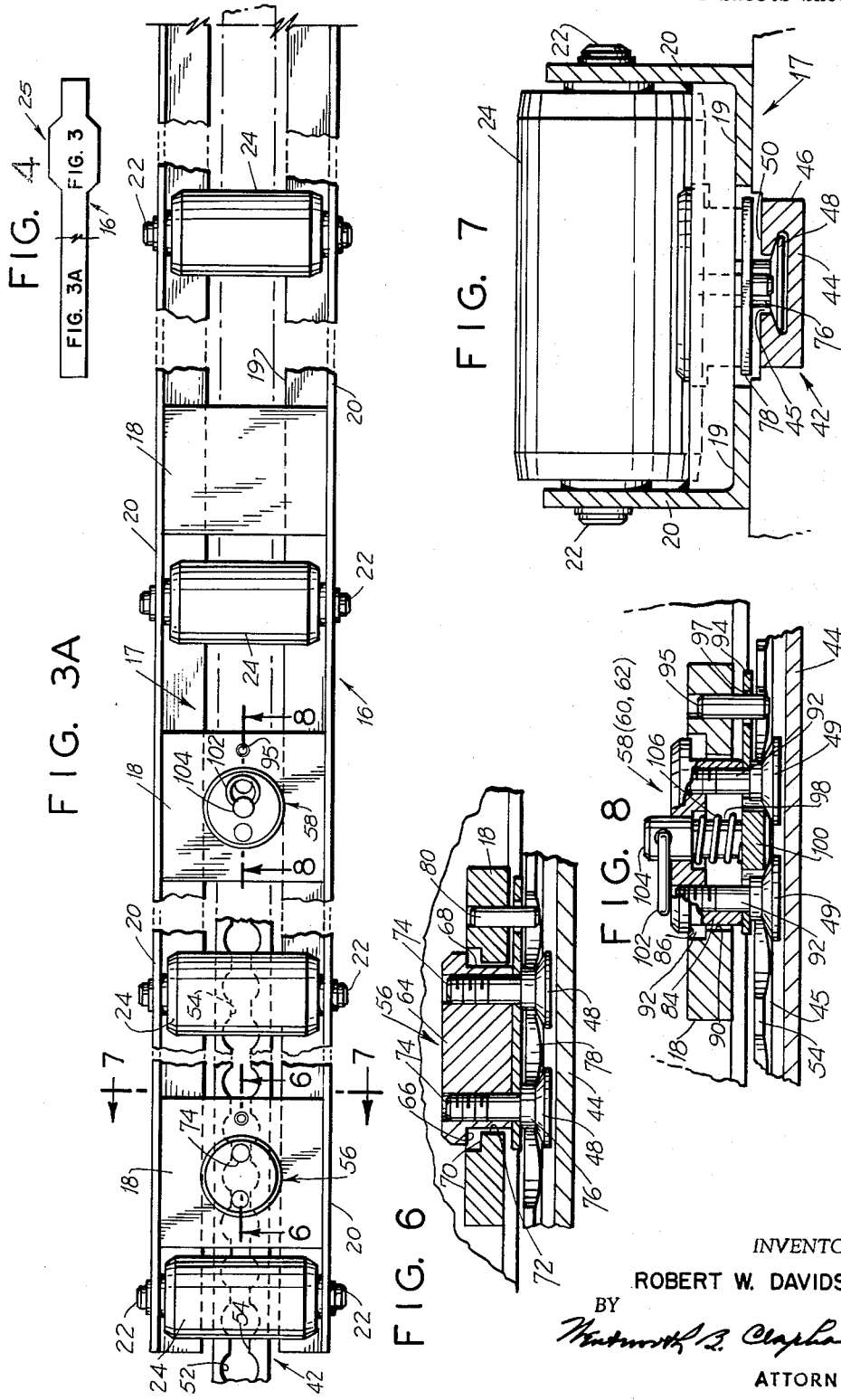

May 17, 1966  R. W. DAVIDSON  3,251,489
CARGO HANDLING APPARATUS
Filed Feb. 11, 1963  8 Sheets-Sheet 5
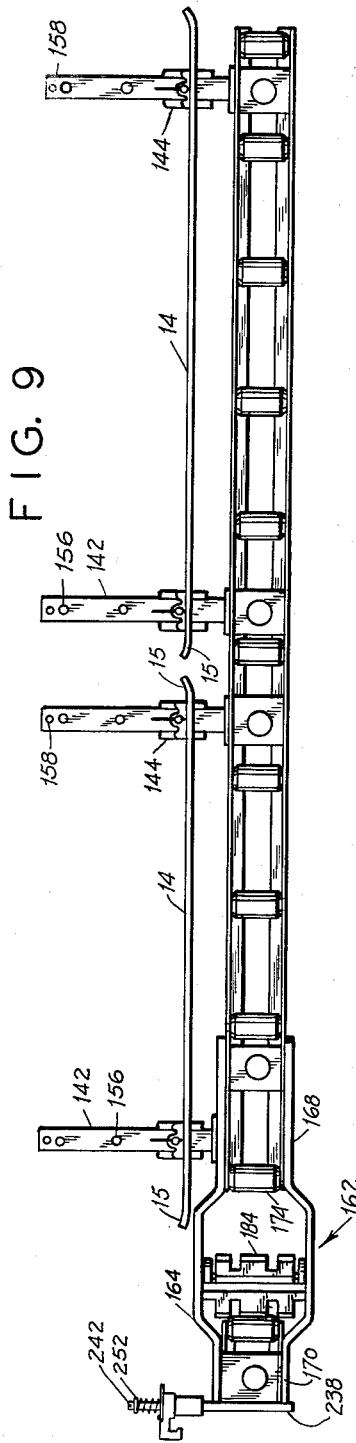
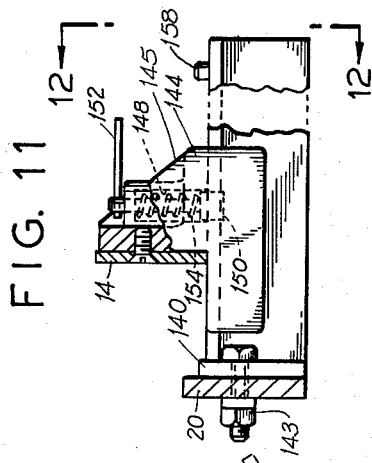
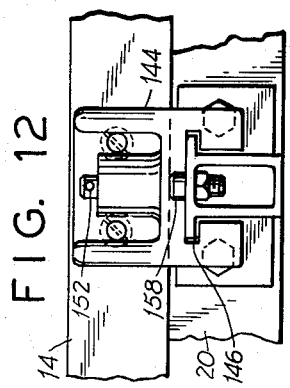
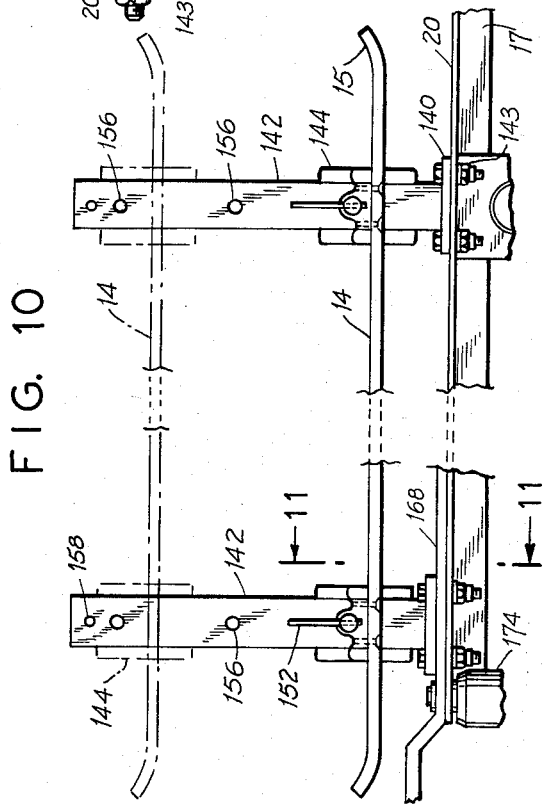
INVENTOR.
ROBERT W. DAVIDSON
BY
ATTORNEY May 17, 1966 R. W. DAVIDSON 3,251,489
CARGO HANDLING APPARATUS
Filed Feb. 11, 1963 8 Sheets-Sheet 6
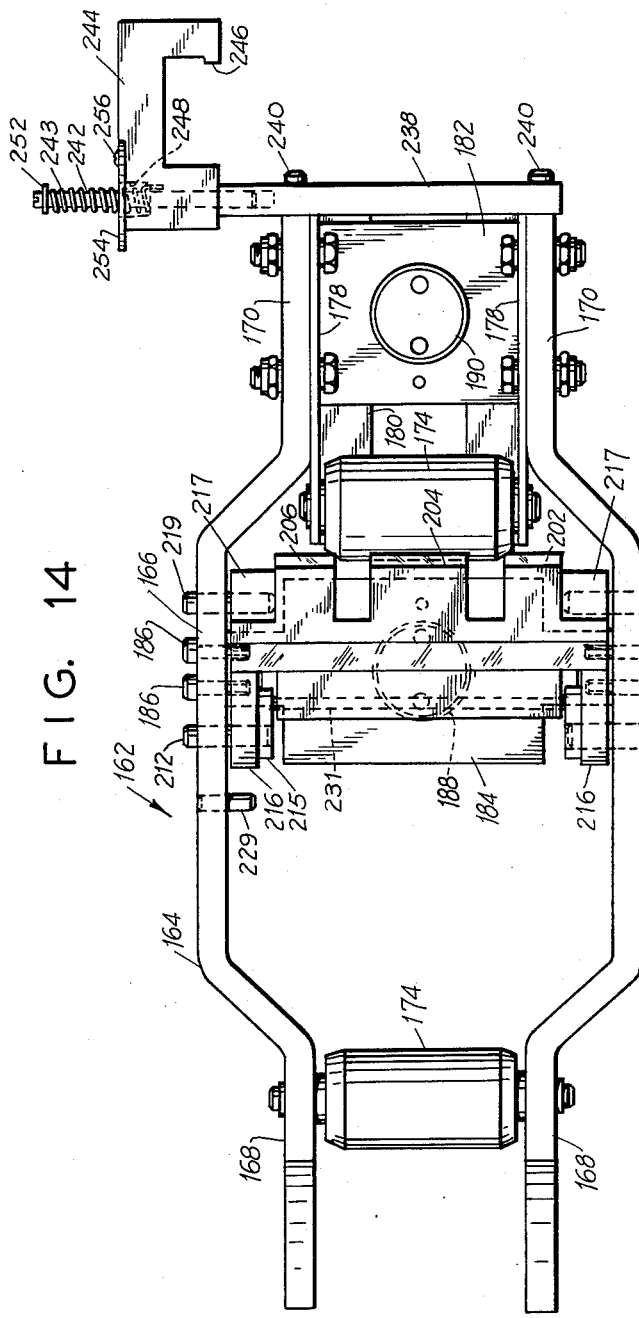
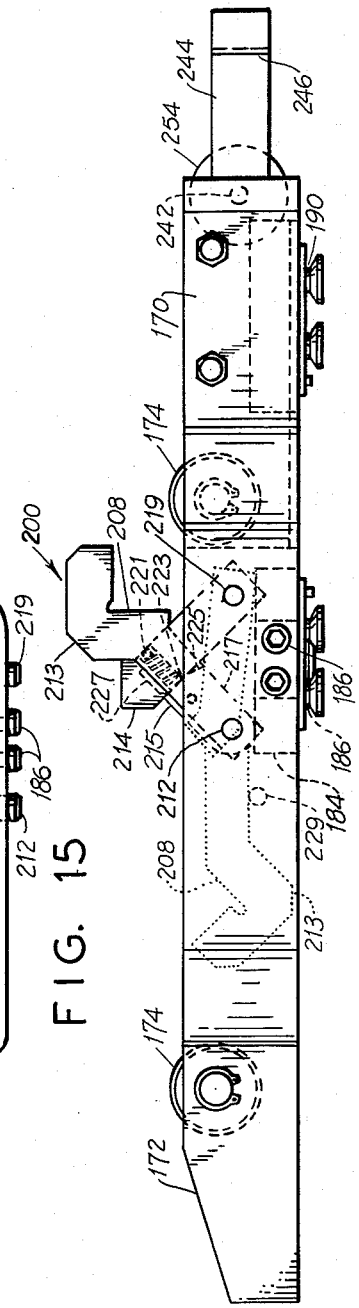
INVENTOR.
ROBERT W. DAVIDSON
BY
ATTORNEY May 17, 1966  R. W. DAVIDSON  3,251,489
CARGO HANDLING APPARATUS
Filed Feb. 11, 1963  8 Sheets-Sheet 7
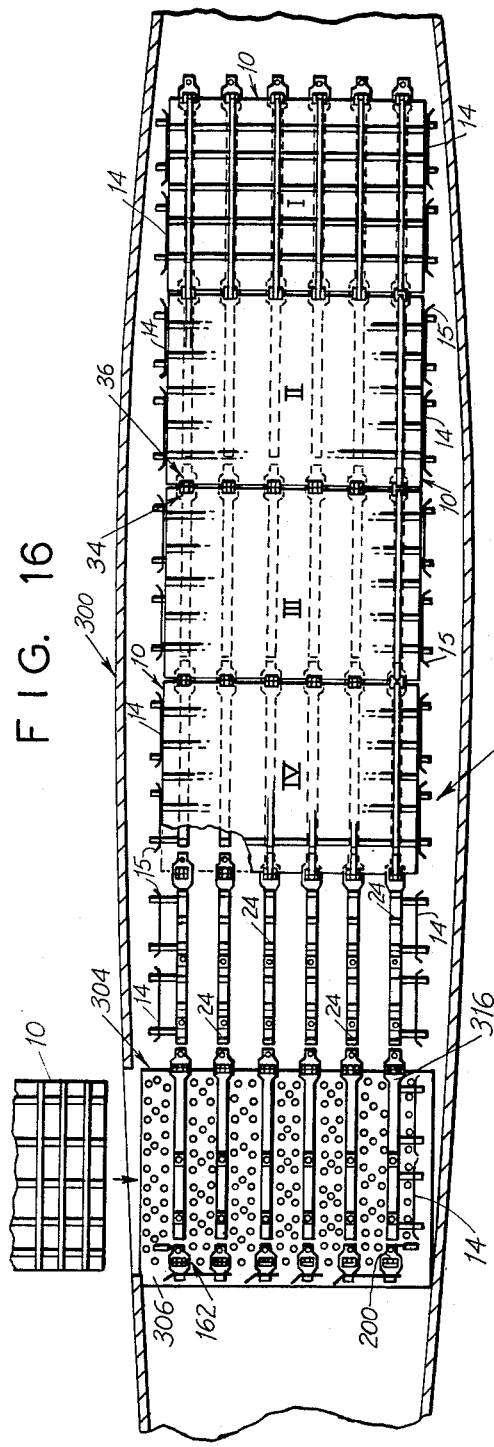
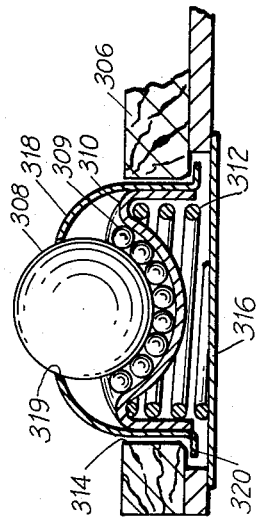
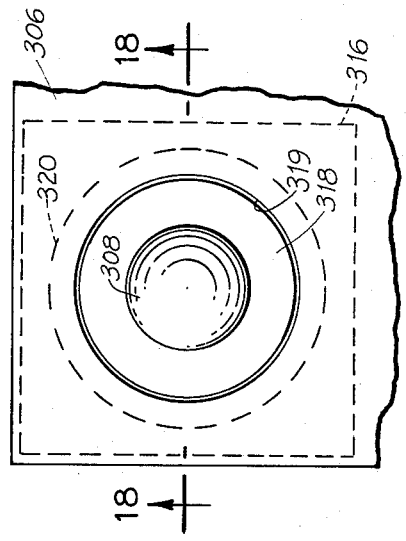
INVENTOR.
ROBERT W. DAVIDSON
BY
ATTORNEY.

May 17, 1966   R. W. DAVIDSON   3,251,489
CARGO HANDLING APPARATUS
Filed Feb. 11, 1963   8 Sheets-Sheet 8
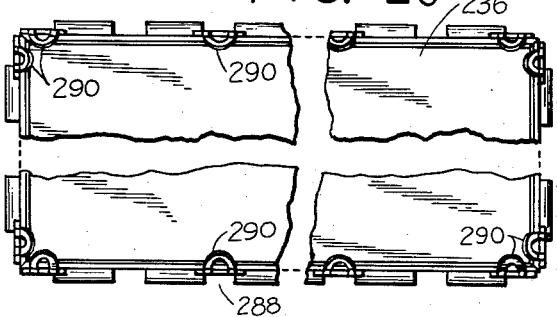
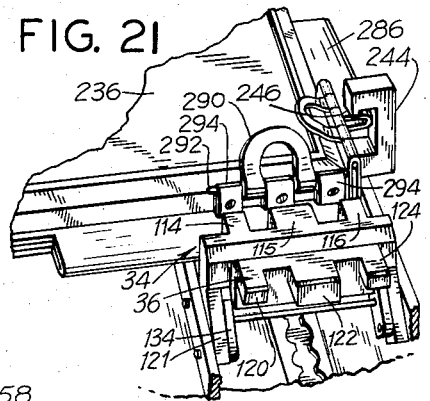
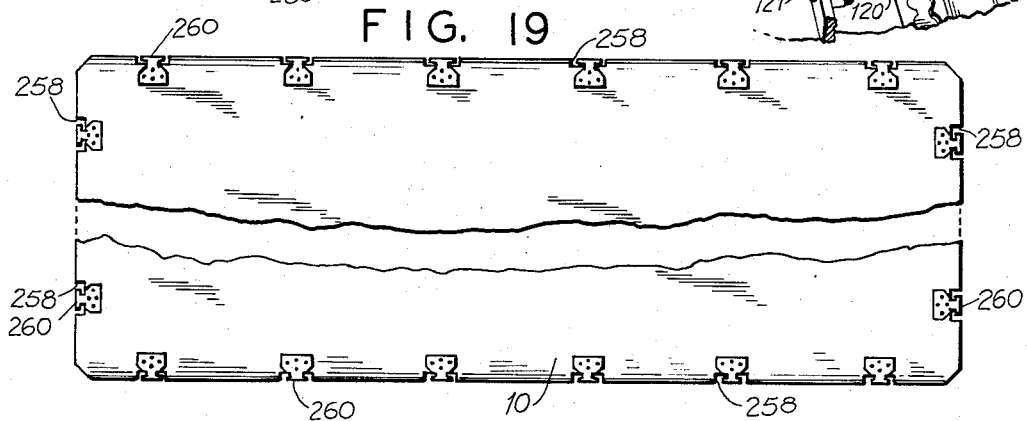
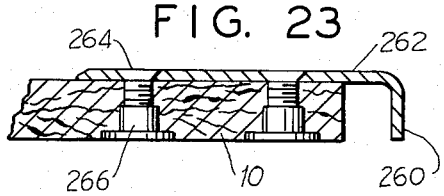
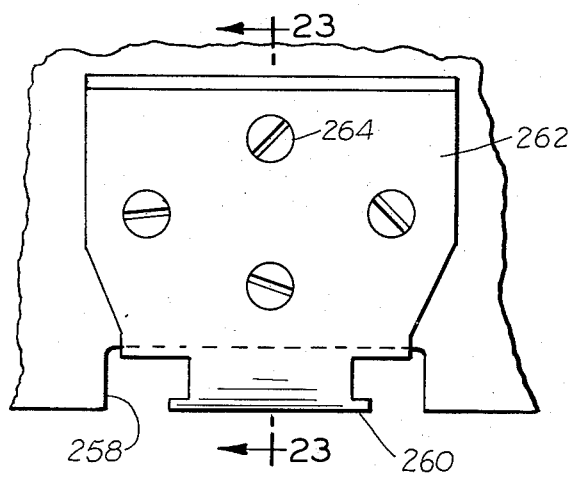
INVENTOR.
ROBERT W. DAVIDSON
BY
ATTORNEY

# United States Patent Office 3,251,489
Patented May 17, 1966

3,251,489
CARGO HANDLING APPARATUS
Robert W. Davidson, York, Pa., assignor to American Machine & Foundry Company, a corporation of New Jersey
Filed Feb. 11, 1963, Ser. No. 261,930
24 Claims. (Cl. 214—84)

This invention relates to cargo handling apparatus and more particularly to improvements in apparatus which is operative to restrain palletized or containerized cargo against movement under all load conditions which may occur while vehicles which are transporting such cargo are in motion.

The present invention is readily adaptable for use in all types of commercial vehicles such as trucks, railroads, cars, ships and aircraft. However, it finds particular applicability in high speed carriers, such as modern airplanes, because of the fact that the apparatus embodying the invention is so designed and constructed that heavily loaded pallets can be rapidly loaded into an aircraft, and its load so secured that under all conditions of flight, including emergency crash landing conditions, the cargo will be securely maintained in safely locked condition against movement from the time it leaves its point of departure until it is delivered at its destination.

The ever increasing size and speed of commercial carriers, such as aircraft, cause serious problems in cargo loading and securing. The size and cost of modern airplanes and increased operating expenses are such that it is necessary to unitize, i.e., palletize or containerize, cargo in order that it can be handled and loaded rapidly, thereby insuring economical utilization of payload space, and minimize turn around time of crew and aircraft. Because the loads carried are very heavy (a modern cargo airplane can carry as much as 88,000 pounds), and loaded pallets or containers or units may weight as much as 10,000 pounds, unless they are adequately secured against shifting or movement, and in such manner that requirements of the Federal Aviation Agency are met, they can break loose and become, in effect, missiles, which obviously would endanger the lives of the crew of the carrier in which they are being transported. This is especially the case in the shipment of cargo in aircraft wherein all of the payload space may be devoted to transportation of cargo or freight, or where only a portion thereof may be used for cargo or freight and the rest being given over to the transportation of passengers. In such case if any portion of a cargo breaks loose the lives of the passengers and crew may be subject to constant danger of injury and even loss of life on take off, during flight or on landing, including emergency crash landings.

Attempts have been made heretofore to provide apparatus for securing palletized cargo or freight for transportation in vehicles, such as aircraft. However, even through pallets have been secured to the floor of the vehicle, it has been found necessary to use auxiliary securing means in order to provide for all contingencies which might arise during the movement of the carrier from point of departure to its destination. In the case of cargo carrying airplane it has been necessary to use barrier nets or transverse partitions between pallets and loads in longitudinally spaced arrangement within the carrier, such as an airplane, so that if for any reason a palleted load should break loose from its securing means the barrier nets or transverse panels would prevent "missiling" of the breakaway load. Many other schemes have been tried to solve the problem of providing satisfactory load securing means for insuring safe transport of freight in flight under all conditions as take-off, flight, landing and possible survivable crash landing of an airplane. Despite the many attempts heretofore that have been made in the art to provide satisfactory cargo handling apparatus, as far as it is known, no one has been able to meet the requirement of the Federal Aviation Agency that the cargo handling system be able to withstand a force of nine times gravity or a force of 9 $g$'s without breakaway failure of the cargo handling apparatus.

The present invention constitutes a solution of the problems mentioned above because it provides a cargo handling apparatus or system in which a palletized load is so contained that the pallet per se plays but a small part in the successful resistance of force imposed upon the load under all conditions of travel. This is due to the fact that the containing means for a load on each pallet is firmly and securely held by mechanism embodying the invention to the floor of the carrier so that even under the most severe flight conditions total loads up to the certified payload carrying capacity can effectively withstand nine times the force of gravity of 9 $g$'s without failure.

The cargo handling apparatus embodying the invention also is extremely versatile in use because it can satisfactorily handle and secure loads which are supported on extremely simple, inexpensive pallets, and also function equally well in securing heavy, rigid pallets for safe transportation from point of departure to a destination when the cargo is removed from the carrier.

The apparatus disclosed herein embodying the invention also can be termed a modular system. This is due to the fact that each set or group of transversely spaced and arranged roller trays or conveyors are detachably connected to the floor of the carrier, such as an airplane, in which they are installed such that each group can operate as a load securing entity regardless of whether or not other sets or groups of roller trays or conveyors are in operation. This construction assures marked versatility and flexibility in the rapid loading and unloading of cargo because it enables the operator to meet successfully all problems with which he may be faced. For example, it may be desirable to install but a single unit of modular trays and terminal trays, described in detail hereinafter, in forming a single pallet or load unit supporting station. It can be seen that all the attached hardware which would be required for such an installation is confined essentially to the area utilized by a pallet or loaded unit which leaves the remainder of the aircraft floor unobstructed and available for use with other types of unpalletized cargo, i.e., passengers, large animals, heavy machinery, automobiles. If two or more stations are required, each station would comprise an additional modular installation consisting of laterally disposed spaced modular trays or roller conveyors.

It is an object of the invention to provide a novel cargo handling apparatus wherein cargo can be transported safely without failure under the most rigorous conditions imposed upon a carrier under any and all conditions to which the carrier may be subjected during its travel from a point of departure to its destination.

It is a further object of the invention to provide a novel cargo handling method and apparatus which is capable of handling very heavy palletized loads and in which the load is directly secured to the floor of the carrier so that the pallet plays but a small part in the safe, secure, attachment of the load to the floor of the carrier for transportation.

The invention is further characterized by the provision of a plurality of tracks formed of tandemly arranged roller trays which trays are provided with opposed sets of locking dogs operative to secure the container or a palletized load to the floor of a carrier, such as an airplane, in order that each palletized load transported by the airplane will be safely secured against any failure or breakaway, during the most severe conditions including a survivable crash landing to which the airplane may be subjected.

The invention is further characterized by the provision of a novel cargo handling apparatus wherein there is provided on the floor of an airplane or other carrier in which the apparatus is installed a plurality of laterally spaced tracks formed of tandemly arranged roller trays which allow loaded pallets to be moved without difficulty onto selected spaced portions thereon where each load on each pallet can be secured by locking dogs mounted in the trays to the floor of the airplane in such manner that even under the most adverse flying conditions including the subjection of the loads on the pallets to forces of nine times gravity, the loads will not break loose but will be carried safely to their destination.

The invention is further characterized by a novel cargo handling apparatus for use in carriers, such as airplanes, wherein the floor of an airplane is provided with a novel load supporting system over which loads can be moved and wherein locking means are so disposed with respect to the pallets being moved into transport positions within the planes that they do not present any obstruction to the motion of the pallets and wherein after the pallets have been positioned in their transport position the locking means are moved into operative relationship either with the pallets or with the nets which contain the cargo on the pallets such that the loads on each pallet can withstand even the severest conditions of flight to which an airplane may be subjected without break-away which would endanger the lives of the passengers or crew.

The invention further consists in the provision of novel locking means for use in securing loads in carriers such as airplanes which are so constructed that during the loading of an airplane they are in inoperative position but which, after the loads are disposed in proper transport position within a plane the locking means can be moved into and locking into operative position such that during transportation of the loads and even under the worst possible condition of flight, including the subjection of a load to forces equal to nine times gravity, i.e., 9 g's, the locking means will so secure the load that there is no danger of break-away or shifting of the loads during flight.

A further object of the invention is to provide a novel modular cargo handling system comprising one or more stations which can be detachably installed in a carrier in order to meet each particular problem which arises in the handling of various types of cargo or freight.

It is a further object of the invention to provide a novel cargo handling system capable of handling unitized loads and one in which loading and unloading of cargo can be effected in a minimum of time.

It is a further object of the invention to provide a novel method for handling cargo loaded pallets wherein the means which contain the cargo on a pallet are secured not only to the pallet but also to the pallet supporting floor of a vehicle for transportation under the most rigorous conditions without breakaway or unwanted movement.

With these and other objects not specifically mentioned in view, the invention consists in the novel features pointed out and described more in detail hereinafter, and set forth in the claims hereunto appended.

In the accompanying drawings which form a part of this specification, and in which like characters of reference indicate the same or like parts:

FIGURE 1 is a partial plan view showing a preferred embodiment of the invention as installed in a vehicle, such as an airplane.

FIGURE 2 is a cross sectional view taken on line 2—2 in FIGURE 1.

FIGURES 3 and 3A taken together constitute a plan view of a roller tray embodying the invention.

FIGURE 4 is a diagrammatic plan view of the assembled relationship of FIGURES 3 and 3a.

FIGURE 5 is a side elevation of the mechanism shown in FIGURE 3.

FIGURE 5A is a sectional view taken on line 5A—5A in FIGURE 5.

FIGURE 5B is a sectional view of a detail of the dog locking mechanism.

FIGURE 6 is a sectional view taken on line 6—6 in FIGURE 3A.

FIGURE 7 is a sectional view taken on line 7—7 in FIGURE 3A.

FIGURE 8 is a sectional view taken on line 8—8 in FIG. 3A.

FIGURE 9 is a plan view showing one of the outer roller trays provided with side guides.

FIGURE 10 is an enlarged partial plan view of a portion of the mechanism shown in FIGURE 9.

FIGURE 11 is a sectional view taken on line 11—11 in FIGURE 10.

FIGURE 12 is an end view taken on line 12—12 in FIG. 11.

FIGURE 13 is a perspective view of the locking dogs of a roller tray in their operative positions.

FIGURE 14 is a plan view of an auxiliary or terminal roller tray unit.

FIGURE 15 is a side view of the device shown in FIG. 14.

FIGURE 16 is a plan view of a modified form of the invention installed in a carrier, such as a side loading airplane.

FIGURE 17 is a view of a detail of the roller tray shown in FIGURE 16.

FIGURE 18 is a sectional view taken on line 18—18 in FIGURE 17.

FIGURE 19 is a partial plan view of a preferred form of pallet used in the practice of the invention.

FIGURE 20 is a partial plan view of a modified type of pallet.

FIGURE 21 is a partial perspective view of a detail of a modified form of structure embodying the invention.

FIGURE 22 is a view of a detail of the pallet shown in FIGURE 19, and

FIGURE 23 is a sectional view taken on line 23—23 in FIGURE 22.

Cargo handling apparatus embodying the invention is readily adaptable for installation and use in many types of vehicles and carriers such as aircraft, trucks, railroad cars and ships. For purposes of illustration it is shown herein as applied to an airplane in which all or a part only of the pay load carrying space is used for carrying freight and cargo.

FIGURE 1 discloses an airplane 2 of the type having a tail 4 hingedly connected thereto at 6 in such manner that when tail 4 is swung to the position shown, a delivery apparatus (not shown) can be located adjacent open tail door 8 for delivery of a loaded pallet 10 therethrough into the airplane 2. As shown in FIGURE 1, two loaded pallets 10 have been secured in an airplane 2 in their proper flight positions I and II. While no specific apparatus is disclosed for delivering loaded pallets into airplane 2, it will be appreciated that any suitable known type of machine, such as a cargo carrier with a lift platform, may be used to locate loaded pallets in such relationship to door 8 that they can be pushed into airplane 2 along the cargo handling apparatus embodying the invention and secured thereon for transportation.

Referring to FIGURES 1 and 2 it will be seen that in accordance with the invention the floor of airplane 2 is fitted with a plurality of detachable elongated tracks, designated generally 12, thereby providing a roller conveyor installation 17. It will be appreciated that tracks 12 could be permanently connected to the floor if desired. These tracks extend longitudinally along the airplane and their length is determined by the amount of space in an airplane being used for cargo. In some airplanes, all available space is used for cargo, the remainder being employed for carrying passengers. In the system illustrated herein there are six (6) elongated tracks 12; two outer tracks having guides 14 referred to in more detail hereinafter, and four (4) central tracks. Tracks 12, which preferably are spaced equidistantly across the floor of airplane 2, are held securely thereto, as described more fully hereinafter.

However, it will be appreciated that tracks 12 can be arranged in some other symmetrical or asymmetrical order in order to meet transportation requirements and in order to adapt a particular airplane to carry cargo, as for example, when seats are removed from a plane and its seat rails or other hold down means are used for holding tracks 12 in operative position in the airplane. In short, the spacing of these rails or hold down means determines the installed arrangement of tracks 12.

Each track 12 comprises one or more elongated roller trays or conveyors 16. In the installation shown in FIGURE 1, where a plurality of roller trays 16, which may be termed modular trays or conveyors, form each track 12, they are arranged in an end to end or tandem relationship. The number of trays 16 in each track for a given installation depends upon the length of the cargo space given over to cargo and freight hauling. Referring to FIGURES 1, 3, 3A and 4, it will be seen that each roller tray 16 in the form illustrated is made up from two elongated spaced angle members 17 secured together by plates 18, as by welding or any other suitable manner. Angle members 17 have upstanding legs 20 in which are suitably supported shafts 22 carrying low friction ball or roller bearing mounted transversely extending rollers 24. Rollers 24 preferably are spaced equidistantly along legs 20. The preferred lengthwise spacing between roller trays 16 is such that the spacing between the last roller 24 of one tray 16, and the first roller 24 of the next adjacent tray 16 is approximately the same as that between rollers 24 in each tray 16. This arrangement insures continuity of roller support and, hence, ease in handling in the movement of loaded pallets along tracks 12 into and out of their hold down flight positions in loading and unloading an airplane.

As illustrated in FIGURES 1, 3, 4, 9, and 16, one end of each roller tray 16 is provided with a locking or hold down section or unit, designated generally 25. Although hold down section 25 is shown at one end of a tray 16, if desired, it could be located at an intermediate point thereof. This section comprises two laterally spaced coupler plates 23 having inner ends 26, outer ends 30 and central positions 32. Inner ends 26 of plates 23 are attached to outer faces of legs 30 of angle members 17 by bolts 28. Outer ends 30 are attached by bolts 37 to the outer faces of upstanding legs 38 of angle members 40 which are secured together, as by welding, to plate 42. Plates 23 are so bent or shaped that central portions 32 thereof are spaced apart a distance greater than the spacing between inner and outer ends 26 and 30, respectively, so as to provide sufficient space for the mounting and operation of its locking or hold down dogs. Legs 38 of the inwardly extending portions of angle members 40 support a transverse conventional low friction type roller 24, in a manner similar to the other rollers 24 of trays 16.

Each roller tray 16 is quickly detachably secured to the floor of airplane 2. In modern aircraft, provisions usually are made for attaching seats to the floor and that they can be removed, and relocated in such spacing as desired, and such means are used in the practice of the invention. Among the means by which seats are readily removable are track or rails formed in the floor beams, as an integral part of the extruded beams, or by tracks or rails rigidly attached to the floor of the airplane by screws or bolts. The latter system is shown in FIGURES 2, 3A, 6, 7, 8, and 21. Integral rails 43 are shown in FIGURES 5 and 5A.

Roller trays 16 are provided with a plurality of locking or fittings, each having locking elements 48. Referring to FIGURES 3 and 3A, it will be seen that four locking fittings 56, 58, 60, and 62 are provided in all but the outer trays where there are five, and that they are mounted in plates 18 in roller tracks 16. The number of locking fittings required, which can vary, must be consistent with the weight of cargo to be carried on a particular pallet, and with the aircraft structure. The main point is that an adequate number of locking fittings be provided so that each roller tray under load can never come loose from the vehicle to which it is attached under any conditions unless and until it is removed by a designated person or operator. The arrangement of locking units 56–62 described above is typical for a particular roller tray 16. However, a different distribution arrangement can be made, if desired, it being noted that unit 56 is a vertical tension fitting which is different from units 58–62 which are vertical tension and horizontal shear fittings.

Unit 56 comprises a circular block 64 having a shoulder portion 66 and a cylindrical body portion 68, adapted to seat loosely, respectively, in circular bores 70 and 72 formed in plate 18 located at the extreme left in roller tray 16 as viewed in FIGURE 3A. Threadably mounted in block 64 are two depending screws 74 having tapered heads or locking elements 48 of a shape of the head of slot 45. As shown in FIGURE 7 locking elements 48 are held positioned beneath locking lips 54 of track 42 between openings 52 through which locking elements 48 are inserted. Locking elements 48 are somewhat smaller in diameter than openings 52 in order that first they may be inserted therethrough into track 42, and then moved beneath lips 54 when a tray 16 is being locked to a selected rail 42.

The shanks of screws 74 are provided with cylindrical enlargement 76 adajacent locking elements 48. These act to support a plate 78 (see FIGURES 6 and 7) having holes through which screws 74 pass. A pin 80 press fitted into plate 18 extends downwardly through an enlarged hole 83 and prevents rotation of unit 56.

Units 58, 60 and 62 each comprises a body member 84 having a shoulder 86 adapted to seat loosely in bores 88 and 90, respectively, formed in supporting plates 18. The construction of these units is shown in detail in FIGURE 8. Each unit 58–62 is provided with screws 92 having heads or locking elements 49 which coact with slot 45 in the same manner as do locking elements 48 of unit 56. A plate 94 located between shoulders 93 of screws 92 and the inner face of body member 84 prevent rotation of units 58–62 in trays 16. This is effected by means of press fitted pin 95 carried by each plate 18 (see FIGURE 8) which extends through hole 97 in plate 94. Plates 78 and 94 lie between the two spaced bottom legs 19 of angle members 17.

Each of units 58, 60 and 62 is provided with an operating pin 98. One end of pin 98 is formed with an enlarged cylindrical shoulder 100; the other end carries an operating member, such as a ring 102 pivotally mounted in an enlarged head portion 104 normally tends to force pin 98 downwardly in body portion 84 and through an opening in plate 94.

When a roller tray 16 is being installed preferably the left end portion thereof, as viewed in FIGURES 1 and 3A, is positioned relative to a track 42 in the vehicle in which it is being installed in such manner that locking elements or heads 48 of locking unit 56 pass through openings 52 in track 42 and enter slot 45. Tray 16 then is given a push, either to the right or to the left, thereby locating heads 48 beneath lips 50.

Concurrently with the sliding movement of locking heads 48 of locking unit 56 beneath lips 50 of track 42, locking heads 49 of units 58, 60 and 62 likewise slide in slot 45 and are located beneath other locking flanges or lips 54 thereof. However, in the operation of units 58–60, when heads 49 are located properly, shoulders 100 of pins 98 are pressed by spring 106 into the opening 52 between the two lips 54 engaged by heads 49 and thus track 16 becomes firmly locked or anchored to the floor of the vehicle.

Shoulders 100 are so shaped with cut out oppositely spaced portions that when ring 102 is pulled upwardly and turned a shoulder 100 will be held in a detent position, whereupon all units 58, 60 and 62 can be either installed or removed. When installed rings 102 and in turn heads 104 are turned back and springs 106 force shoulders 100 into holding engagement.

Referring to FIGURES 1, 3, 5, 9, 13, 16 and 21 the locking dog section 25 of each roller tray 16 comprises a pair of locking dogs 34 and 36. As shown in FIGURE 1, each locking roller tray 16 is positioned, when installed, such that its locking dog section 25 extends forwardly in the vehicle or carrier. Thus, locking dog 34 may be termed a fore dog, and dog 36 may be designated an aft dog. This is due to the fact that, as illustrated in FIGURE 5, dogs 34 restrain the front portion of a palletized load, and dogs 36 perform a similar function with reference to the rear portion of the adjacent load.

It will be apparent from a consideration of FIGURES 1 and 16, that a cargo handling apparatus constructed in accordance with the invention is made up of a plurality of tracks 12, and that in turn each track installation may comprise several end to end roller trays 16. The number and spacing of tracks 12 depends upon loading restrictions and the extent of the area of the floor of the aircraft or other carrier in which the system embodying the invention is used. By the appropriate number and arrangement of track 12 the present invention can meet successfully all loading conditions imposed upon a given airplane or carrier.

Locking dog 34 (FIGURES 1, 3A, 5, 5A, 9, 13, and 21) comprises a transverse block member 108 and two spaced legs 110, one at each end thereof loosely pivotally supported in pins 112 in central portion 32 of plates 23 of unit 25. Projecting outwardly from block member 108 and substantially at right angles thereto are three hold down lugs 114, 115 and 116 (FIGURES 3, 5A, and 13). Central lug 115 is wider and thicker than lugs 114 and 116 which form an operating pair. The reason for this is that lug 115 is used in handling one type of pallet 10, whereas lugs 114 and 116 are used with another, for reasons described more in detail hereinafter. The cross sectional area of lug 115 and that of both lugs 114 and 116 are approximately the same.

Locking dog 36, which is complementary to dog 34, comprises a transverse block member 118 having two spaced legs 120, one at each end, loosely pivotally mounted on pins 123 supported in central portion 32 of coupler plates 23 (see FIGURE 3). Projecting outwardly from block 118 and substantially at right angles thereto are locking lugs or fingers 120, 122, and 124. As in the case of lug 115, lug 122 is wider and thicker than lugs 120 and 124 which are spaced therefrom on its opposite sides for the same reason as lugs 114 and 116.

The cross sectional area of lug 122 is substantially the same as that of both lugs 120 and 124. Positive locking means are provided for preventing the movement of dogs 34 and 36 out of their operative positions. This comprises locking arms 134 which are connected by cross rod 137 and are mounted for swinging movement on pins 123 from the broken line to the full line position, shown in FIGURE 13. Each locking arm 134 is provided with a cam face 139 and a chamfered corner 141 which coact with shoulders 138 on legs 110 of dog 34 to maintain dogs 34 and 36 locked against separating movement. An extension 136 on each arm 134 acts as a stop to engage a portion of legs 110 and thereby limit downward movement of arms 134, as viewed in FIGURE 13. Locking arms 134 rigidly hold dogs 34 and 36 in their operative positions until arms 134 are swung manually out of engagement with shoulders 138, whereupon dogs 34 and 36 can be returned to their inoperative positions, shown in broken lines in FIGURE 5.

The chamfered corner 141 on cam face 139 assists in the camming locking action of lock arms 134 as they are moved home to lock dogs 34 and 36 together. The cam face 139 maintains lock arms 134 in operative position such that any increase in load on a dog 34 or 36 means that more force would have to be applied to swing arms 134 out of locking position. In other words, if the load on dog 36 is such as might be encountered in an upwardly sloped aircraft, is in excess of that which an operator could apply to hold the load back, then he would be unable to swing arms 134 out of locking engagement and thus unlock dogs 34 and 36.

Block member 108 is provided with a spring ball type detent 126 mounted substantially centrally thereof. Detent 126 comprises a spring 128 which bears against and urges ball 130 outwardly through an opening in a detent cellar into engagement with face 132 of block member 118 of dog 36. Detent 126 functions to exert a slight pressure on block member 118 tending to force dogs 34 and 36 apart, which prevents locking arms 134 from being opened, as by vibration, during flight or a trip.

It is an important feature of the invention that when cargo is being loaded into a vehicle or carrier, such as airplane 2, locking dogs 34 and 36 of all trays 16 be located below the level of all rollers 24. Locking dogs 34 and 36 are chamfered, as at 35. This allows them to seat lower in their supporting trays 16 with dog 36 resting on the floor of the airplane. See FIGURE 5. Thus, neither of the dogs 34 and 36 nor any parts thereof, at any time offer an obstruction to the free movement of pallets on trays 16. A stop pin 117 projecting outwardly from central position 32 of one of side plates 23 when engaged by one of the legs 120 of dog 36 within the confines of a tray 16 when it is removed from an airplane 2.

Referring to FIGURE 1, it will be seen that in the system installed in airplane 2, all of the locking dog sections 25 of the several longitudinally arranged and laterally disposed and installed trays 16 are so located that their respective locking dogs 34 and 36 are disposed in a predetermined transverse alignment for proper coaction with the cargo or load containing means, hereinafter described. Thus the containing means of pallet 10 at position I and pallet 10 at position II are properly restrained by sets of transversely aligned locking dogs 34 and 36 against the inertial forces caused by movement or motions of the aircraft. The same operative arrangement obtains with respect to all other pallets 10 to be loaded in airplane 2.

As mentioned hereinabove outer trays 16 and tracks 12 formed from an installed longitudinally aligned group of trays 16 are provided with guides 14 for properly locating pallets laterally 10 within airplane 2, and to absorb transverse forces caused by the movement or motion of the aircraft. Although a single side guide or rail 14 might be provided for each outer tray 16, it has been found expedient to use two to more uniformly support the side forces. As shown in FIGURES 1, 2 and 9–12 inclusive, the outer leg 20 of angle member 17 of each outer roller tray 16 has attached thereto by bolts 143 two pairs of longitudinally spaced brackets 140. Each bracket 140 is provided with an elongated generally T-shaped extension 142 on which is slidably mounted a guide support bracket 144 to which side guide or rail 14 is attached. The ends of side guides or rails 14 preferably are curved as at 15 to facilitate movement of loaded pallets 10 therealong.

Each bracket 144 is provided with a generally T-shaped slide portion 146 by means of which it is seated on bracket extension 142 for movement therealong to a predetermined adjusted position. Brackets 144 are provided also with vertical bores 148 in which are located stop pins 150, which carry a transverse lifting handle or pin 152. A spring 154 encircling each stop pin 150 and bearing against the top of bore 148 and an enlarged shoulder on stop pin 150 normally forces stop pin downwardly into a recess or hole 156 formed in extension 142. There are spaced holes in each extension 142 so that a plurality of adjustments of side guides 14 can be made in order to effect the accommodation of various widths of pallets 10. The desired adjustment of side guides 14 is made by lifting up on handle 152 which results in the removal of stop pin 150 from one of the holes 156 so that bracket 144 can be slid along extension 142 to another desired location. Inclined faces 145 on bracket 144 provide cam surfaces along which handle 152 can be moved to bias locking pin 150 upwardly out of a hole 156 against the pressure of spring 154. Handle 152 is supported by the top of cam face 145 during the inward or outward adjustment of side guides 14, after which it is turned in the opposite direction, and pin 150 is pressed into a hole 156.

Referring to FIGURE 1, it will be seen that each cargo handling apparatus 21 embodying the invention comprises a plurality of tracks 12 each including a short length of roller tray or a terminal roller tray or roller conveyor, designated generally 162, which forms the terminal continuation of each track 12 of an installation. In the installation disclosed herein track 12 extends from a point to the right within airplane 2, as viewed in FIGURE 1, to a point adjacent the loading door 8.

Each terminal roller tray 162 comprises two side or coupler plates 164. These plates are shaped so as to form a widely spaced central portion 166 and two end portions 168 and 170 closer together but at a distance which is slightly greater than the spacing between upstanding legs 20 of a roller tray 16. As viewed in FIGURES 14 and 15, end portion 168 is tapered, as at 172, so as to present an inclined planar surface for entry of a loaded pallet onto the series of laterally spaced and aligned terminal roller trays 164, as viewed in FIGURE 1. Mounted in end portion 168 is a ball or roller bearing mounted roller 174 similar in construction and function to rollers 24 in trays 16. End portions 170 of plates 164 are attached by bolts 176 to upstanding legs 178 of angle members 180 which are secured together by cross plate 182. The free ends of legs 178 support a transverse roller 174 which is similar in construction and function to rollers 24 in trays 16. The spacing between rollers 174 is approximately the same as that between rollers 24 in trays 16. A generally cross shaped connecting plate 174 attached to coupler plates 164 by screws 186 strengthens the tray assembly and also serves as a support for locking unit 188. This locking unit is similar in construction and operation to locking units 58, 60 and 62 described hereinabove and shown in FIGURE 8. Mounted in plate 182 is a second locking unit 190 which is similar in construction and operation to locking unit 56 described hereinabove and shown in FIGURES 6 and 7. Terminal trays 162 are installed in an airplane 2 on rails or tracks 42 in the same manner as tracks 16. The distance end to end between trays 162 and 16 preferably is such that rollers 174 and 24 are approximately equidistant.

Referring to FIGURE 1, it will be seen that terminal roller trays 162 constitute the rear end of any group of tandemly installed trays 16 in an airplane 2. Therefore, terminal trays 162 are provided with only one active dog 200, which corresponds in function to dog 36. Each dog 200 is provided with legs 217, one at each end of body 208, pivotally mounted on pins 219 in plates 166. Each dog 200 also has three spaced operating lugs 202, 204 and 206 which extend outwardly substantially at right angles from body 208 thereof. Lugs 202, 204 and 206 correspond to lugs 120, 122 and 124 on dog 36. Coacting with dog 200 is a member 214 which as shown in FIGURES 14 and 15, is provided with a spring urged detent or pressure finger 221 (similar in construction and operation to detent or pressure finger 126, described hereinabove), preferably located centrally in member 214 and which detent or finger bears resiliently against body 208 of dog 200 when the latter is in its operative position shown in FIGURE 15. Member 214 is provided with legs 217 pivotally supported on pins 219 mounted in plates 166.

Dog 200 is held in its operative locking position by means of locking arms 214 connected by rod 231 and pivotally mounted on pins 212 supported in plates 166. Each of these arms is provided with a cam face 223 having a chamfer 225 and a stop projection 227 which engages a shoulder on legs 217 to limit downward motion of locking arms 215 in a clockwise direction as viewed in FIGURE 15 when cam face 223 is lodged against the under surface of member 214 as shown in FIGURE 15, at which time dog 200 is maintained in locked relationship with respect to member 214. As in the case of the construction disclosed in FIGURE 5, detent or finger 221 tends to separate dog 200 from member 214 and by means of this coaction, locking arms 215 are maintained in their proper locking relationship and separation or unlocking of dog 200 with respect to member 214 cannot occur despite any vibration or shock to which dog 200 may be subjected while it is in locking relationship with a palleted load supported on tracks 16 in a carrier such as airplane 2. A chamfer 213 extending along the entire upper surface of dog 200 allows it to set well below the operating limits of rollers 174 in terminal tray 162. A pin 229 extending outwardly from the inside face of one plate 166 maintains dog 200 in the position shown in FIGURE 15, when tray 162 is removed from airplane 2 or other carrier in which it was installed.

The structure described thus far is designated primarily for use with loads on pallets 10 of the type shown in FIGURES 19, 22 and 23. Because under some conditions it may be desired to use a different type of pallet, such as pallet 236, shown in FIGURES 20 and 21, roller trays 16 and 162 are provided with additional locking means for effecting the necessary attachment and restraint of such pallets in the carrier in which they are used.

Referring to FIGURES 14 and 15, terminal tray 162 is provided with a cross plate 238 secured by screws 240 to the ends of coupler plates 164 adjacent plate 182. Threadably mounted in one end of cross plate 238 and extending laterally beyond tray 162 is an elongated pin 242 on which is loosely swingably mounted a U-shaped lock device 244 having an inturned lip 246 on the free leg of the U. Device 244 is provided with a bore 248 in which is located one end of a spring 243 which encircles pin 242 having one end anchored in the base of bore 248 and its other end bearing against washer 252 secured to the head of threaded pin 242. A circular plate 254, which serves as a hand grip, is attached by screw 256 to lock device 244. While lock device 244 is shown in its operative relationship with a terminal tray 162, it will be understood, see FIGURE 9, that it can also be mounted on and operate in the same manner when installed on any of the trays 16 forming the outer tracks of an installation, such as shown in FIGURES 1 and 16.

In the descrpition hereinabove it has been noted that dogs 34, 36 and 200 are provided with three laterally spaced securing elements 114–116, 120–124 and 202–206, respectively. This construction provides a versatile cargo handling system, in that it makes it possible for the same system to accommodate more than a single type or size of pallet severally or in combination, and interchangeably with aircraft of differing basic configurations. FIGURES 19, 22 and 23 show one type of pallet and FIGURES 20 and 21 disclose another type of pallet which can be handled in the same system disclosed herein.

Referring to FIGURES 19, 20 and 23 which show one type and/or size of pallet, it will be seen that pallet 10 comprises a relatively thin sheet of a suitable material. It can be formed from plywood, strips of wood cemented together, or laminated combinations composed of wood, plastics and the like. Typical pallets 10 may have dimensions in the range of 88 inches by 108 inches and 88 inches by 120–122–125 inches. Due to the size of the pallets used, it will be appreciated that very heavy loads are handled, say ranging up to 8,000–10,000 pounds or more. A cargo airplane such as a Boeing 707–320 C is certified by the Federal Aviation Agency to carry a pay load of as much as 88,000 pounds. In view of this it is apparent that these loads and cargoes must be secured with the certainty that under all conditions of take off, flight, landing and survivable crash landings in which inertial forces are likely to reach a level equal to nine times gravity (9 g.s.), there will be no loosening, shifting or cargo break-away which would result in it becoming in effect a missile and thereby endanger the lives of the passengers and crew. Referring to FIGURES 1 and 16, it will be seen that the tandem spacing between trays 16 and 162 is such that pallets of the sizes specified can readily be handled and they and their loads secured for transit. As shown, the spacing between sets of dogs 34 and 36, and 200 is such that pallets 88 inches long can be secured. Obviously, trays 16 and 162 could be designed to support these sets of dogs for a different spacing relationship.

The Federal Aviation Agency regulations relating to aircraft equipment and structures require that any cargo handling equipment installed and used in aircraft be capable of withstanding all of the conditions described above. It is significant that cargo handling apparatus embodying the invention satisfactorily meets all of these requirements, and has been certified as such by the Federal Aviation Agency.

As shown in FIGURES 19, 22 and 23, pallet 10 is provided with a plurality of openings, such as recesses 250 formed in the front and rear ends and sides thereof. These recesses preferably are equidistantly spaced in order that when a pallet is located in its flight position on airplane 2, hooks 260 in recess 258 will be in position to coact with locking dogs 34, 36, and 200 so that each load on each pallet can be restrained and secured under all conditions which may be encountered on the ground and in flight. Each hook 260 forms an integral part of the plate 262 attached to pallet 10 by screw 264 and nuts 266. The outer edge of each hook 260 is aligned with the outer edge of pallet 10.

In FIGURES 1 and 2 loaded pallets 10 are shown in their restrained positions I and II on tracks 12. Locking dogs 34 and 36 of each roller tray provided for these positions are also shown in their operative locking or restraining positions. As shown in FIGURE 2, the load L on pallet 10 is contained with innet 268 constructed from high strength nylon tapes 270, 271, 272, 276 which are crossed and/or criss-crossed and connected together where they cross. This can be done by sewing in some cases or by use of suitable conventional metal clips or fastening means 280 and by rings 278 which hold vertically disposed tapes 270 in proper operative relationship. The actual load supported on a pallet 10 may be constituted of regularly shaped objects, such as boxes and packing cases, or they can be made of a miscellaneous assortment of articles and goods. FIGURE 2 indicates the several arrangements of load which can be handled satisfactorily.

While a net 268 is mentioned above as containing the cargo on a pallet, it will be understood that the invention also includes the use of other types of containing means, such as a rigid or semi-rigid container of suitable design.

Load forming templates of conventional design are positioned at opposite sides of a pallet to be loaded. In this way loads contoured to the required aircraft shape can be formed. The templates also can be used to support nets 268 which contain each load while the load is being built up.

Referring to FIGURES 2, 3, 5, 5A and 13 it will be seen that each vertically disposed tape 270 has permanently attached to its end adjacent pallet 10 a ring 282 provided with an opening of such size and shape that locking lugs 115 and 122 of dogs 34 and 36 respectively will extend therethrough when these dogs are raised to their operative restraining positions (see FIG. 5). Tapes 270 are provided with a suitable conventional tape of cam lock buckle 269 so that any desired tension can be imposed on each tape in securing a load L on a pallet 10, or on a pallet 236, and rings 282 in engagement with hooks 260.

It will be noted that in operation each ring 282 hooks over a hook 260 on a pallet 10 but that each locking lug 115 and 122 of fore and aft dogs 34 and 36 acts to provide the real restraint against cargo movement due to all forces imposed acting in an upward direction. In fact pallets 10 play but a small part in the picture because they function primarily as the support means on which a load can be assembled and loaded into a carrier, such as airplane 2. It is important to note that the high strength nylon nets 268 secured by vertically disposed tapes 270 to tie down rings 282 over hooks 260 and held by locking dogs 34 and 36 actually tie the entire load on each pallet 10 to the floor of airplane 2, and thereby positively assure adequate restraint of the cargo against sudden changes in direction or velocity. This system therefore, constitutes a restraint configuration in which "crash" loads are transmitted through net 268 directly into the locks comprising dogs 34, 36 in trays 16 and thereby to the floor of the carrier, in this case airplane 2.

It is not necessary to provide locking dogs for the longitudinal sides of a load on a pallet 10 because they engage side guides 14 which prevent lateral shifting. Therefore, downwardly extending side tapes 271 have rings 284 which engage hooks 260 on plates 262 secured equidistantly along the opposite longitudinal sides of pallet 10. Thus, side tapes 271 assist in holding net 268 properly over the load on a pallet 10. Recesses 258 and hooks 260 also give pallets 10 an omnidirectional feature which adapts it for use in other arrangements than that shown.

FIGURES 20 and 21 disclose another type of pallet 236 in which the edges of the pallet are provided with reinforcement on the form of shaped or extruded metal stripping 286 having recesses 288 formed therein. In cross section the metal stripping is formed in the general shape of a V (see FIG. 21). In this embodiment pallet 236 plays an important part in restraining the load on a pallet 236 against shifts in direction or changes in velocity. It is rigid in construction, relatively thick and provided with stripping 286 which constitutes a further rigid reinforcement. Mounted above each recess 288 is a pivoted ring 290 supported on pivot pins 292 supported in arms 294 attached by screws to stripping 286. Pallets 236 are similar in size to pallets 10 described hereinabove.

In use, pallet 236 is held down on track 12 by fore and aft dogs 34 and 36, one pair of dogs being located proximate each recess 288. It will be apparent from FIGURE 21 that center lug 115 of fore dog 34 does not engage stripping 286 due to the presence of recess 288 into which lug 115 extends. However, lugs 114 and 116 of fore dog 34 which are provided in order to adapt the invention for use with pallet 236, engage the upper surface of stripping 286 and thereby restrain the front end of pallet 236 against movement. In the same manner center lug 122 of aft dog 36 extends into a recess 288 while lugs 120 and 124 secure the rear end of pallet 236 against movement. Side guides 14, as in the case of loaded pallets 10, prevent lateral shifting thereof. Tapes 270 and 271 are attached by suitable hooks (not shown) to rings 290, and tensioned, as desired, by buckles 269.

Referring to FIGURES 20 and 21, it will be seen that the outwardly extending "V" portion of stripping 286 does not extend to the corners of a pallet 236. Therefore neither lug 116 nor lug 124 of dogs 34 and 36, respectively, adjacent the corners, can engage and hold down any part of the pallet, as do all other lugs 114 and 116, and 120 and 124. For this reason lock device 244 is provided to further insure the rigidity of attachment of pallet 236 to the floor of airplane 2.

As mentioned hereinabove, when desired, each roller tray 16 can be provided with a lock device 244, such as shown in FIGURE 14 and described hereinabove. In FIGURE 14 lock device 244 is shown in its inoperative position. It is moved to its operative position shown in FIGURE 21 by grasping plate 254 on device 244, pulling device 244 outwardly against the resilient pressure of spring 243 and turning it 90° from the position shown, whereupon it is released and allowed to press resiliently in locking position against the flat surface of V-shaped stripping 286 where it remains until it is manually released.

FIGURE 16 discloses the invention as installed in an airplane 300 which is loaded through a side door 302. A pallet 10 is shown about to be moved through door 302 into the airplane onto a roller mat system designated generally 304 of conventional design made up of a plurality of plates 306 each provided with a number of suitably spaced low friction bearing pallet supporting rollers 308 supported in plates 306 in a manner described hereinbelow. As in the case of airplane 2 disclosed in FIGURE 1 the floor is provided with an installation 23 comprising tandemly arranged trays 16 which can be designated standard trays and terminal trays 42, secured to rails similar to rails 42 (not shown in FIGURE 16), so as to maintain all trays 16 and 42 in spaced aligned relationship. The manner of mounting trays 16 and 162 is the same as that described hereinabove in connection with the installation of these trays in airplane 2. It is to be noted, however, that trays 316 located between roller mat plates 306 are not provided with rollers 24. This is done to insure that pallets 10 (or 236), being moved through door 302 of airplane 300, will roll smoothly and without obstruction transversely of plane 302 and against side guides 14 where they can be pushed longitudinally into plane 300 along rollers 24 of trays 16 to their final lock down positions I, II, III, IV shown in FIGURE 16. The locking means comprises dogs 34, 36, and 200 described hereinabove.

Balls 308 are contained in sockets 310 mounted on springs 312 secured in openings 314 in plates 306 by means of plates 316 suitably attached to the under side of plates 306. Each ball 308 is supported on a bed of smaller balls 309 contained within socket 310 in known manner whereby each ball 308 is free to roll under load of a pallet 10 or 236. A housing 318 provided with an opening 319 through which a ball 308 projects and maintains it in its proper operative relationship. This housing is attached to the side walls of socket 310 and is provided with a flange 320 which secures the assembly in operative relationship with plate 306.

Hooks 260 can be formed as plates 264 attached either to the top of pallet 10 (FIGURES 19, 22 and 23) or to the bottom thereof (FIGURE 5). Other suitable connecting means also could be provided.

FIGURES 1 and 16 disclose installations 21 and 23, respectively, which comprise several longitudinally aligned modular units. With one exception each unit is composed of a plurality of laterally spaced roller trays or conveyors 16. The exception is that unit shown at the extreme left in FIGURES 1 and 16, which comprises not only laterally spaced roller trays 16, but also laterally spaced and tandemly arranged terminal trays 162. It will be appreciated that because trays 16 and 162 are quickly detachably attached to the floors of their respective carriers, i.e., airplanes 2 and 300, it requires but a matter of minutes to install or remove any or all modular units.

In the installations shown in FIGURES 1 and 16, all modular units are in operative condition. However, any selective removal can be made, as desired, in order to use payload space for another purpose. That is, if in installation 21, FIGURE 1, it were desired only to load the unit at position I, installation 21 would remain as shown until pallet 10 had been located at position I and its load secured. When this is done, all other components, i.e., trays or roller conveyors 16 and terminal trays or conveyors 162 can be removed in the manner described hereinabove. However, in order to complete the single remaining modular unit, terminal trays 162 equal in number to the trays 16 in operation at position I are installed in tandem arrangement therewith such that dogs 200 of trays 162 can be moved into securing relationship with the loaded cargo unit or pallet 10 located at position I, and secured, as described hereinabove, against release until such release is desired. In this way payload space is made available for non-unitized or non-palletized cargo. In removing cargo from position I, terminal roller trays 162 are detached and the installation 21 as shown in FIGURE 1 is again made with great rapidity involving only a few minutes so that the loaded pallets 10 can be pushed on rollers 24 to discharge door 8. Obviously a similar operation obtains with all other modular conveyor units, with the exception of that located adjacent the carrier door, as described hereinabove.

It should be noted that once locking arms 134 are moved home to locking positions, as shown in FIGURES 3, 5, and 13, and the next loaded container, unit or pallet 10 has been so positioned as shown in FIGURE 5, arms 134 cannot be moved out of locking coaction with legs 110 of dog 34 until, during unloading, this or corresponding pallets 10 have been moved away from dogs 34. Space is provided between the top of pallets 10 and lugs 115 and 122 of dogs 34 and 36, respectively, which facilitate horizontal movement of pallets during loading and unloading operations. Dogs 200 in terminal trays 162 are maintained locked as described hereinabove until unloading is to begin, at which time locking arms 215 are moved to their inoperative position and dogs 200 likewise can be moved to their inoperative positions, as indicated in broken lines in FIGURE 15.

The versatility of the cargo handling apparatus embodying the invention becomes even more apparent when it is considered that the roller trays 16 and 162 described hereinabove are both stowable and stackable. By means of this construction, when trays are removed from an installation 21 or 23, such as shown in FIGURES 1 and 16 respectively, they can be stowed in portions of the body of an airplane and carried therewith. Hence, if the load to be carried on the return flight of the airplane requires the use of additional modular conveyor units, trays 16 and/or 162 can be removed from their storage place in the airplane and reinstalled as required in order to meet the particular demands of the cargo to be handled.

It will be seen that the invention provides an extremely versatile cargo handling system in which vehicles or carriers, such as aircraft, can be loaded to their full allotted capacity and wherein it is unnecessary to provide auxiliary means, such as "barrier nets" or transverse partitions, attached to the carrier between loaded pallets in order to insure the safe transit of a load to its destination. In other words, by means of the novel structure embodied in the invention, full capacity loads can be carried on commercial aircraft, without restrictions on cargo loads to considerably less than normal aircraft capacity.

What is claimed is:

1. In a cargo handling system for use in the transportation of preloaded pallets, in a carrier having a cargo supporting floor structure equipped with attaching means and an opening through which said pallets may be loaded into said carrier, the improvement comprising a plurality of laterally spaced tracks carried by said floor structure and extending longitudinally therealong, each of said tracks comprising at least one elongated roller conveyor, means detachably securing said tracks to said floor structure to coact therewith as a complementary part of said structure, a plurality of pallet supporting low friction rollers carried by each of said conveyors and spaced approximately equidistantly therealong for supporting each pallet for movement to a position for transportation in said carrier, a cargo retaining device containing said cargo on each of said pallets, said device including substantially vertically disposed members having securing rings at the lowermost terminal ends thereof, locking means for securing each of said pallets against substantial horizontal movement on said tracks from said position, and said means also including locking means engaging said securing rings and firmly holding said cargo on said pallet to said floor structure of said carrier against vertical movement, whereby movement of said cargo during all conditions of travel of said carrier is prevented.

2. The invention defined in claim 1 wherein said tracks include a plurality of inner tracks and an outer track on each side of and spaced laterally from the outermost of said inner tracks, and side guides carried by said outer tracks extending therealong for holding said pallets against lateral movement when said carrier is in motion, and wherein at least one of said side guides is adjustable relative to the other.

3. A cargo handling system for use in airplanes having a cargo supporting floor and a door through which loaded pallets may be loaded onto said airplane, comprising in combination a plurality of tracks extending along the floor and longitudinally thereof, means securing said tracks to said floor, a plurality of a pallet supporting low friction rollers carried by each of said tracks spaced approximately equidistantly therealong for supporting each loaded pallet for movement from said door to a position for transportation by said airplane, locking means comprising oppositely facing complementary sets of movable locking members for locking the front end of one pallet and the rear end of an adjacent pallet in longitudinally spaced relationship on said tracks against substantial vertical and longitudinal movement thereon while said airplane is in motion, means mounting said locking members on said tracks for movement relative thereto, including means for positioning said locking members beneath the operative plane of said rollers to provide an unobstructed path of travel for said pallets when said pallets are being moved thereon to said positions for transportation, and for movement upwardly above said plane of said rollers into operative securing positions relative to said pallets.

4. A cargo handling system for use in airplanes having a cargo supporting floor and a door through which cargo supporting units may be loaded into said airplane, comprising a roller conveyor installation on the floor of said airplane, comprising a plurality of laterally spaced tracks extending longitudinally along said floor, each of said tracks including a plurality of tandemly arranged roller trays, low friction rollers carried by each of said trays, and spaced substantially equally therealong for supporting each loaded unit delivered into said airplane for movement to a position therein for transportation, locking means comprising transversely aligned sets of oppositely facing complementary dogs carried by selected roller trays for securing the front end of one unit and the rear end of an adjacent unit against substantial movement thereon while said airplane is in motion, means movably mounting said locking means on said trays for movement into and out of unit securing position.

5. The invention defined in claim 3, wherein said door is located in the side of said airplane, a conveyor installation extending transversely of said airplane adjacent said door and of a width equal to the width of a pallet, said installation comprising a plurality of strips provided with low friction rolling members, guide means for limiting the transverse movement of loaded pallets into said airplane, and a set of transversely extending spaced single locking dogs for securing the rear end of the pallet positioned on said installation against substantial movement while said airplane is in motion.

6. A cargo handling apparatus for a carrier having a supporting floor, comprising a plurality of elongated roller conveyor trays extending longitudinally in said carrier, means detachably mounting said conveyor trays in a predetermined laterally spaced relationship on the floor of said carrier, and locking means mounted on each of said conveyor trays, a plurality of terminal roller conveyor trays detachably secured to the floor of said carrier and arranged in tandem with said first set of trays, locking means mounted on each of said terminal trays, locking means being mounted for movement into securing relation with a unitized load supported on the rollers of said standard and terminal trays, securing means on said unitized load positioned to be engaged and held by said locking means, and means for securing said locking means against release while said carrier is in motion.

7. A cargo handling apparatus for a carrier having a supporting floor, comprising a plurality of elongated roller conveyor trays comprising a first set of trays extending longitudinally in said carrier, means detachably mounting said conveyor trays in a predetermined laterally spaced relationship on the floor of said carrier, and locking means mounted on each of said conveyor trays, a plurality of roller conveyor trays comprising a second set of trays detachably secured to the floor of said carrier and arranged in tandem with said first set of trays, locking means mounted on each of said terminal trays, said locking means being mounted for movement into securing relation with a unitized load supported on the rollers of said standard and terminal trays, securing means on said unitized load positioned to be engaged and held by said locking means, and means for securing said locking means against release while said carrier is in motion.

8. The method of handling cargo which comprises disposing a containing device over cargo loaded on a pallet, said device having load restraining members located on at least two opposite sides of said cargo, attaching the lower ends of said members to said pallet to secure said cargo on said pallet for movement into a vehicle for transportation, moving said loaded pallet into said vehicle, positioning said loaded pallet in a predetermined location in said vehicle for transportation and then also attaching said same lower ends of said members to the floor of said vehicle such that forces induced by the cargo when reacting to unwanted motion of the vehicle are transmitted through said members of said containing device directly to the floor of said vehicle rather than through the intermediary of the pallet, thereby relieving said pallet from subjection to said forces.

9. A cargo handling system for use in a carrier having a cargo supporting floor structure, and an opening through which loaded pallets may be located into said carrier, a plurality of tracks carried by said floor structure, means detachably securing said tracks to said floor structure, a plurality of pallet supporting rollers carried by each of said tracks for supporting each pallet delivered thereon for supporting each pallet for movement to a position for transportation in said carrier, a device containing said cargo on each of said pallets, said device including substantially vertically disposed members having securing rings on the lower terminal ends thereof, and locking means for securing each of said pallets against substantial horizontal movement on said tracks from said position, said locking means also including means engaging said securing rings and firmly holding said cargo on said pallet to the floor structure of said carrier against vertical movement, whereby movement of said cargo during all conditions of travel of said carrier is prevented, means mounting said locking means in longitudinally spaced arrangement on said tracks, means insuring the positioning of said locking means beneath the plane of support of said rollers when pallets are being moved on said rollers to transporting positions on said tracks, and means operative when said locking means are moved into locking position relative to a pallet for securing said means in said locked position.

10. A cargo handling system for use in a carrier having a cargo supporting floor structure, and an opening through which loaded pallets may be loaded into said carrier, a plurality of tracks carried by said floor structure, means detachably securing said tracks to said floor structure, a plurality of pallet supporting rollers carried by each of said tracks for supporting each pallet delivered thereon for supporting each pallet for movement to a position for transportation in said carrier, a device containing said cargo on each of said pallets, said device including substantially vertically disposed members having securing rings on the lower terminal ends thereof, and locking means for securing each of said pallets against substantial horizontal movement on said tracks from said position, said locking means also including means engaging said securing rings and firmly holding said cargo on said pallet to the floor structure of said carrier against vertical movement, whereby movement of said cargo during all conditions of travel of said carrier is prevented, said locking means comprising oppositely disposed sets of transversely aligned dogs for locking the front end of one load and the rear end of another load against movement caused by travel of said carrier.

11. The invention defined in claim 10, wherein said transversely aligned dogs engage and lock corresponding laterally spaced securing rings on said vertically disposed members to said floor of said carrier.

12. The invention defined in claim 11, wherein each of said dogs comprises a body portion and a locking lug extending substantially at right angles therefrom, projecting through a securing ring and extending over a lateral portion of said pallet.

13. The invention defined in claim 12, including ring securing hooks, means mounting said hooks in substantially equidistantly spaced arrangement along the edges of said pallets whereby each of said rings may hook over one of said hooks on said pallet, and said lugs may extend through said ring, and secure said load on said pallet against substantial movement.

14. The invention defined in claim 10, wherein each of said dogs comprises a central locking lug, and an outer lug spaced laterally from each side of said central lug, said central lugs being operative to secure one type of loaded pallet to the floor of said carrier, and said outer lugs being operative to secure another type of loaded pallet to the floor of said vehicle.

15. The invention defined in claim 14, wherein each pallet secured by said outer lugs of said dogs comprises metal reinforcing extending along the edges thereof, and said reinforcing is provided with recesses spaced therealong and at said corners, whereby one of said outer locking lugs positioned to engage said corner of said pallet is inoperative, and auxiliary locking means for locking said corners against vertical movement.

16. A cargo handling system for use in a carrier having a cargo supporting floor structure and a door through which loaded pallets may be loaded into said carrier, comprising a plurality of spaced tracks carried by said floor structure, a plurality of low friction rollers carried by each of said tracks spaced approximately equidistantly therealong for supporting each loaded pallet for movement from said door to a position for transportation in said carrier, spaced locking means coacting with said spaced tracks for securing each of said pallets in longitudinally spaced relationship on said tracks against substantial movement thereon while said carrier is in motion, means movable mounting said locking means for movement relative to said tracks to inoperative positions beneath the supporting plane of said rollers whereby loaded pallets may be moved thereover to predetermined transportation locations in said carrier, and to operative positions above the supporting plane of said rollers, said locking means comprising transversely aligned sets of oppositely facing complementary sets of dogs for locking the front end of one pallet and the rear end of another pallet against substantial vertical and longitudinal movement caused by travel of said carrier.

17. A cargo handling system for use in an airplane having a cargo supporting floor structure and a door through which loaded pallets may be loaded into said airplane, comprising a plurality of spaced tracks carried by said floor structure, a plurality of low friction rollers carried by each of said tracks spaced approximately equidistantly therealong for supporting each loaded pallet for movement from said door to a position for transportation in said airplane, spaced locking means coacting with said spaced tracks for securing each of said pallets in longitudinally spaced relationship on said tracks against substantial movement thereon while said airplane is in motion, means movably mounting said locking means on said tracks for movement thereover of loaded pallets to predetermined transportation locations in said airplane, means operative when said locking means are moved into locking position relative to said pallets for retaining said locking means in operative securing position relative to loaded pallets, said tracks including a plurality of inner tracks and an outer track outside of and spaced laterally from the outermost of said inner tracks and adjustable side guides carried by said outer tracks extending therealong for holding said pallets against lateral movement when the plane is in motion.

18. The invention defined in claim 16 wherein the loads on said pallets are contained in nets, securing means including rings carried by said nets having means for attaching said rings to said pallet and wherein at least one of said dogs of said sets of dogs extends through a corresponding ring on a net on a pallet and locks said net to the floor of said airplane.

19. A cargo handling system for use in a carrier having a cargo supporting floor structure and a door through which loaded pallets may be loaded into said carrier, comprising a plurality of spaced tracks carried by said floor structure, a plurality of low friction rollers carried by each of said tracks spaced approximately equidistantly therealong for supporting each loaded pallet for movement from said door to a position for transportation in said carrier, spaced locking means coacting with said spaced tracks for securing each of said pallets in longitudinally spaced relationship on said tracks against substantial movement thereon while said carrier is in motion, means movably mounting said locking means on said tracks for movement thereover of loaded pallets to predetermined transportation locations in said carrier, means operative when said locking means are moved into locking position relative to said pallets for retaining said locking means in operative securing position relative to loaded pallets, said mounting means pivotally supporting said locking means in longitudinally spaced arrangement on each of said tracks, means positioning said locking means beneath the plane of support of said rollers on said tracks when pallets are being moved on said rollers to said transporting positions thereon, said locking means comprising oppositely directed dogs, arranged to coact with the front end of one pallet and the rear end of the next adjacent pallet, each of said dogs comprising a central locking lug, and an outer lug spaced laterally from each side of said central lug, said central lugs being operative to secure one type of loaded pallet to the floor of said carrier, and said outer lugs are operative to secure another type of loaded pallet to the floor of said carrier.

20. The invention defined in claim 19 wherein said pallet secured by said outer lugs of said dogs comprise metal reinforcing extending along the edges thereof, and said reinforcing is provided with recesses spaced therealong and at said corners, whereby one of said outer locking lugs positioned to engage said corner of said pallet is inoperative and auxiliary locking means for locking said corners against vertical movement.

21. A cargo handling system for use in airplanes having a cargo supporting floor and a door through which cargo supporting units may be loaded into said airplane comprising a roller conveyor installation on the floor of said airplane, comprising a plurality of laterally spaced tracks extending longitudinally along said floor, each of said tracks including a plurality of tandemly arranged roller trays, low friction rollers carried by each of said trays, and spaced substantially equally therealong for supporting each loaded unit delivered into said airplane for movement to a position therein for transportation, locking means carried by selected roller trays for securing each of said units against substantial movement thereon while said airplane is in motion, means movably mounting said locking means on said trays for movement into and out of unit securing position, said locking means comprising sets of oppositely facing, transversely aligned locking dogs for locking the front end of one unit and the rear end of an adjacent unit against substantial vertical and horizontal movement of said airplane and said locking means carried by the tray supporting an end of the last unit loaded in said airplane comprising a transversely aligned set of dogs positioned to lock said end of said unit to the floor of said airplane.

22. A roller tray for use in a cargo handling apparatus for a cargo carrier for transporting loaded pallets, comprising an elongated frame including two spaced side walls, low friction load supporting rollers mounted in said walls in substantially equidistant arrangement in said walls for supporting a loaded pallet, load carrying pallet locking means carried by said frame, said locking means comprising a set of oppositely facing complementary dogs, and means movably mounting said dogs in said frame for movement from an inoperative position beneath the supporting plane of said rollers into coacting operative positions with the front and rear ends of adjacent loaded pallets on a tray for securing said pallet in said carrier against substantial movement during all conditions of travel of said carrier.

23. The device defined in claim 22 wherein said pallets are provided with securing means, and one of said dogs of said set of oppositely facing dogs is arranged to engage said securing means on one end of one loaded pallet and the other dog of said set is arranged to engage said securing means on the opposite end of an adjacent loaded pallet.

24. In a cargo handling system for use in a carrier having a cargo supporting floor structure, a door through which loaded pallets may be loaded into said carrier, and a plurality of spaced trays carried by said floor structure; the improvement wherein said trays include at least one roller supported therein, a pair of complementary dogs, means pivotally mounting said dogs in said tray with each of said dogs having a holding portion facing in opposite directions, and means supporting said dogs within the confines of said tray when said dogs are in their inoperative positions below the supporting plane of said roller for movement into operative positions with their holding portions above said frame and facing in opposite directions for locking the front end of one pallet and the rear end of an adjacent pallet.

References Cited by the Examiner
UNITED STATES PATENTS

| | | | |
|---|---|---|---|
| 2,334,124 | 11/1943 | Peterson | 214—84 |
| 2,351,314 | 6/1944 | Ario | 296—35 |
| 2,439,423 | 4/1948 | Fowler | 244—118 |
| 2,605,064 | 7/1952 | Davis | 244—118 |
| 2,631,885 | 3/1953 | Ault | 296—35 |
| 2,710,105 | 6/1955 | Schwartz | 244—137 X |
| 2,802,583 | 8/1957 | Dansereau | 214—84 |
| 2,811,240 | 10/1957 | Fenton | 214—514 X |
| 2,858,774 | 11/1958 | Batten | 214—38.8 X |
| 2,892,603 | 6/1959 | Averill | 108—55 |
| 2,923,512 | 2/1960 | Campbell | 108—55 |
| 2,949,863 | 8/1960 | Cozzoli | 104—135 |
| 3,059,592 | 10/1962 | Cozzoli | 214—38.8 X |

GERALD M. FORLENZA, *Primary Examiner.*

A. J. MAKAY, *Assistant Examiner.*